Aug. 12, 1947.   H. ECKHOFF   2,425,604
HANDLE FOR COOK POTS
Filed Dec. 7, 1945
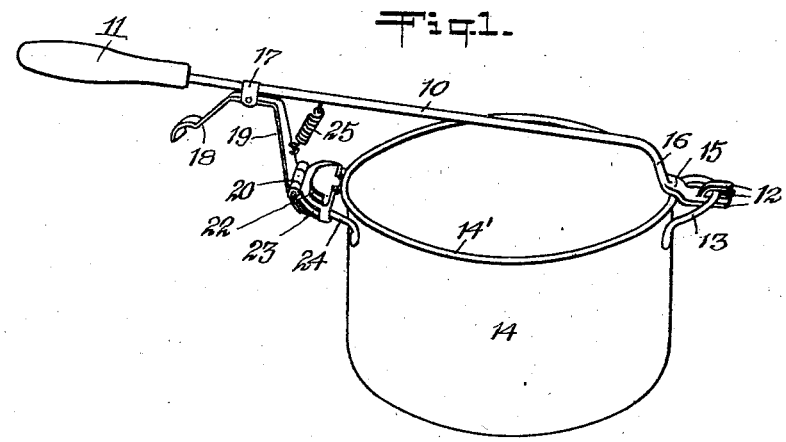
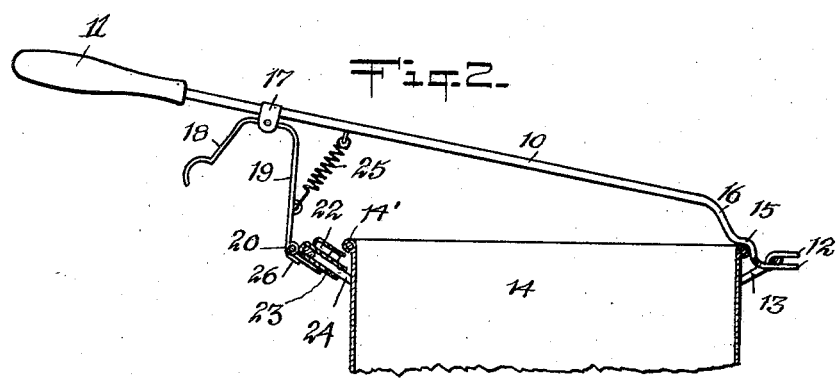
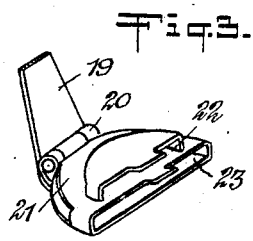
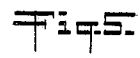
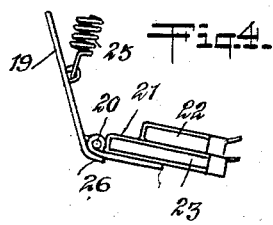
INVENTOR.
Herman Eckhoff
BY
Munn, Liddy & Glaccum
Attorneys Patented Aug. 12, 1947

2,425,604

UNITED STATES PATENT OFFICE 2,425,604

HANDLE FOR COOK POTS

Herman Eckhoff, Cedarhurst, N. Y., assignor of one-half to Harry Jacobs, Cedarhurst, N. Y.

Application December 7, 1945, Serial No. 633,384

2 Claims. (Cl. 294—28)

This invention relates to potlifting devices and has for an object to provide a simple, efficient, strong, durable, inexpensive lifter which can be easily handled without danger to the hands of the operator.

A further object is to provide a device in which the cover of the pot is held in place when a cover is used so that the contents of the pot can be easily drained without the cover falling off.

A still further object is to provide a lifter which can be quickly and easily applied without the hands of the operator touching the pot at all.

Further and more specific objects, features and advantages will more clearly appear from a consideration of the specification hereinafter especially when taken in connection with the drawings which form part of the specification and which illustrate a present preferred form which the invention may assume.

Briefly and generally considered the lifter device comprises a rod to be disposed over the top of the pot with fingers at one end to engage the handle and enable the pot to be lifted and to prevent the handle from tilting on the rod. At the other end of the rod is a socket mounted on a pivoted lever and hinged thereto. Said lever can be manipulated by the operator to engage the socket with the other handle without the operator having to touch the pot. A spring operates on the pivoted lever to tend to move the socket into handle-engaging position.

Briefly then and broadly the invention comprises a rod disposed over the top of the pot with means on one end of the rod to engage a handle of the pot, manipulable means disposed near the other end of the rod, and means on the manipulable means to engage the other handle of the pot.

The present preferred form which the invention may assume is illustrated in the drawings, of which, Fig. 1 is a perspective view of a pot with the lifter attached thereto;

Fig. 2 is a partial vertical section through the pot and parts of the lifter;

Fig. 3 is a perspective view of certain handle-engaging sockets;

Fig. 4 is a side elevation of said sockets; and

Fig. 5 is a perspective view of certain handle-engaging fingers.

The present preferred form of the invention comprises a lifter in the form of an elongated rod 10 with a grip 11 at one end and a series of spaced fingers 12 at the other end. In the form shown there are two laterally spaced lower fingers 12 and one medially disposed upper finger 12. These fingers are adapted to be engaged with one of the handles 13 of a pot 14, and in this case the two lower spaced fingers will keep the pot from swinging or tilting on the lifter member.

It will be noticed that the rod 10 at the point adjacent the bead 14 on the top of the pot is curved as at 15 so as to rest on said bead when the fingers 12 are engaged with the handle 13. The rod then extends upwardly for a short distance as at 16 and then across the top of the pot in a gentle slope to the grip element 11. This formation is to cause the rod to bear against a lid which may be disposed on the top of the pot 14 and to be sure that it is in the main disposed along most of its length well above the top of the pot. Furthermore, with the rod bearing on the bead, 14' of the pot, it makes the engagement of the fingers 12 with the handle 13 a more secure engagement so that the pot, in being lifted, can be so handled with greater ease and with a greater sense of security that the pot will not tilt or that the fingers will slip out of engagement and spill the contents.

At the other end of the rod 10 adjacent the grip element 11 there is fastened a pivoted lever by means of a clamp 17 and this lever has two arms 18 and 19, the first to be manipulated by the finger of the operator and the second at its lower end supporting, by means of a hinge 20, a metallic plate member 21 in which are formed two different sizes of sockets 22 and 23 superposed thereon. These socket members have a depth and horizontal width to amply receive the other handle 24 of the pot 14, and because of their configuration will also prevent the pot 14 from tilting. A spring 25 is connected between the rod 10 and the middle of the lever arm 19 and tends at all times to swing this arm anti-clockwise, and thus advance the sockets toward the handle with which they are to be individually associated depending upon the size of the handle to be engaged. The extension 26 of the handle 19 supports metallic plate 21 and limits its downward movement on hinge 20.

In the operation of the device, the grip 11 is grasped in the hand and the fingers 12 are disposed on both sides of the farther handle 13 of the pot. The rod is then swung down to the position shown in Fig. 1 with the curved portion 15 thereof resting on the bead 14' of the pot 14. The lever arm 18 is then gripped by the fingers of the operator and pulled back against the resistance of the spring 25 until this manipulation brings the desired socket in line with the other handle 24 of the pot 14. The finger grip is then released from the pivoted lever and the spring 25 will then force the socket into snug engagement with the handle as shown. The operator then can lift the pot 14 by grasping the grip element 11 and the pot can be easily and safely moved from place to place and if there is a cover on the pot it will be held securely in place at the same time. When the pot is disposed in its final place the lifter can be released by pulling on arm 18 thus withdrawing the sockets from engagement with the handle 24 after which the fingers 12 can be withdrawn from engagement with the handle 13. This device is especially useful in transferring pots from the stove to sinks where the liquid contents thereof are to be drained off without danger of burning or scalding the hands of the operator.

While the invention has been described in detail and with respect to a present preferred form which the invention may assume, it is not to be limited to such details and form since many changes and modifications may be made in the invention without departing from the spirit and scope of the invention in its broadest aspects. Hence it is desired to cover any and all forms and modifications of the invention which may come within the language or scope of any one or more of the appended claims.

What I claim as my invention, is:

1. A pot lifter which comprises a rod to be disposed over the top of a pot, two laterally spaced fingers on said rod to lie beneath the handle of the pot and a single finger disposed medially over the two lower spaced fingers and adapted to lie over the handle of the pot, the rod adjacent the fingers being curved to form a portion adapted to rest upon the edge of the pot when the rod is in lifting position, a pivoted two-arm lever attached to the rod near its other end, a socket hinged to one of said pivoted arms and adapted to be moved into engagement with the other handle of the pot, a spring attached to the rod and said arm and tending to move the socket toward the pot handle, the other arm of the pivoted lever adapted to be grasped by the fingers of the operator to adjust the socket with respect to the handle to be engaged thereby.

2. A pot lifter which comprises a rod to be disposed over the top of a pot, two laterally spaced fingers on said rod to lie beneath the handle of the pot and a single finger disposed medially over the two lower spaced fingers and adapted to lie over the handle of the pot, the rod adjacent the fingers being curved to form a portion adapted to rest upon the edge of the pot when the rod is in lifting position, a pivoted two-arm lever attached to the rod near its other end, a socket hinged to one of said pivoted arms and adapted to be moved into engagement with the other handle of the pot, a spring attached to the rod and said arm and tending to move the socket toward the pot handle, the other arm of the pivoted lever adapted to be grasped by the fingers of the operator to adjust the socket with respect to the handle to be engaged thereby, the socket having sufficient width when engaging the handle to prevent the pot from tilting with respect to the rod.

HERMAN ECKHOFF.

REFERENCES CITED

The following references are of record in the file of this patent:

UNITED STATES PATENTS

| Number | Name | Date |
| --- | --- | --- |
| 1,134,905 | Prochaska | Apr. 6, 1915 |
| 1,355,050 | Kimball | Oct. 5, 1920 |
| 1,732,804 | Chicoine et al. | Oct. 22, 1929 |
| 1,737,769 | Palmquist | Dec. 3, 1929 |

FOREIGN PATENTS

| Number | Country | Date |
| --- | --- | --- |
| 395,902 | Italy | Mar. 3, 1932 |